Figure 1:
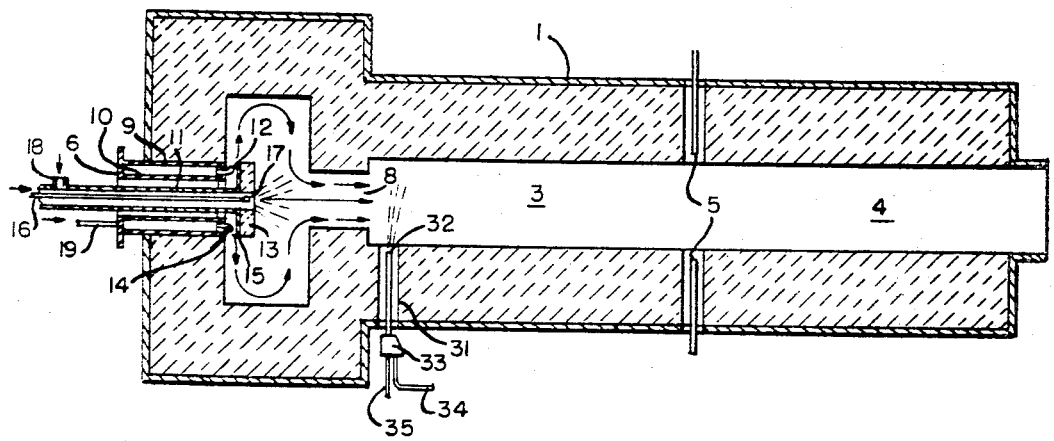
Figure 2:
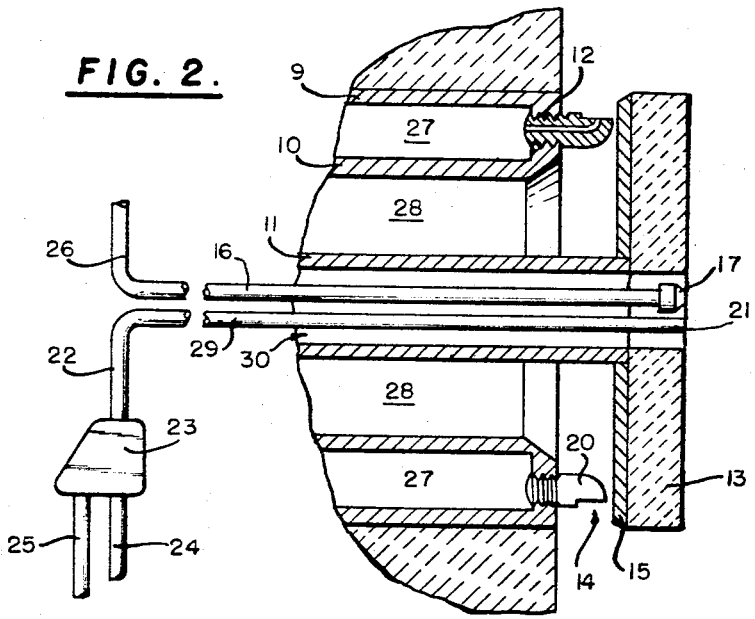

Oct. 29, 1968

F. A. HINSON, JR 3,408,165

PRODUCTION OF CARBON BLACK

Filed June 24, 1966

INVENTOR
Fletcher A. Hinson, Jr.

BY *Walter H. Schneider*

ATTORNEYS

United States Patent Office 3,408,165
Patented Oct. 29, 1968

3,408,165
PRODUCTION OF CARBON BLACK
Fletcher A. Hinson, Jr., Aransas Pass, Tex., assignor to Ashland Oil & Refining Company, Houston, Tex., a corporation of Kentucky
Filed June 24, 1966, Ser. No. 560,317
10 Claims. (Cl. 23—209.4)

This invention relates to carbon black. More particularly, it relates to the production of carbon black. Still more particularly, it elucidates a new and useful mode of controlling the properties of carbon black while it is being produced in accordance with the furnace process.

The well known channel or impingement process produced a good product, but was wasteful and of limited versatility. Consequently, it has gradually been replaced by the furnace process.

In every carbon black process, a hydrocarbon is the raw material, and it is caused to break down, crack, decompose or dissociate into carbon black and byproducts by the application of heat. The hydrocarbon raw material is commonly referred to as "make" or "feedstock." The necessary heat may be obtained by burning a portion of the feedstock to carbon oxides and water, the remainder dissociating to carbon black and by-products. Alternatively, heat may be provided by burning some hydrocarbon other than the feedstock. When a separate hydrocarbon is employed to generate heat, it is referred to as "fuel." It is of course possible to burn both fuel and part of the feedstock, and this is most often the case in the furnace process.

The furnace process is characterized by a number of features which clearly set it apart from other methods. One such feature is the fact that the process is conducted in a confined zone or zones of limited cross-section ranging from a few inches to a few feet across. Hot combustion gases from the burning of fuel and/or feedstock are generated on a continuous basis in the confined zone(s) or in external burners in communication with the zone(s). Sufficiently high rates of combustion are maintained to sustain a very hot (e.g. above 2000° F.) flow of turbulent combustion gases moving through said zone(s) at very high, e.g. near sonic, velocities. The process is conducted in highly specialized furnaces, known as reactors, of which a wide variety are known to persons skilled in the art. The various reactors differ from one another in such details as the number, shape and dimensions of the confined zone(s), the means for generating and directing the flow of the combustion gases and the means for introducing and directing the feedstock into the hot combustion gases.

Quite apart from being mere soot, the carbon black produced in such reactors is characterized by certain properties which, according to the manner of production, may be present in varying degrees: particle size, surface area, acidity or alkalinity (pH), tint, ash content, modulus, structure and others. Certain combinations of such properties are essential if the product is to be suitable for a given use, e.g. reinforcement of vulcanized rubber, whereas different combinations of such properties are required for other uses, such as utilization as a colorant for ink. Also, specifications for carbon black for a given use change from time to time as changes are made in the materials with which the carbon black must be used. For example, the introduction of a new type of synthetic rubber has at times required an adjustment of one or more properties of the carbon blacks offered to the rubber industry.

A variety of factors determine the extent to which different properties develop in carbon black. Fuel, air and feedstock rates are important. Conditions favoring a higher yield of carbon black tend to develop less surface area in the carbon black and vice versa. The types of hydrocarbons present in the feedstock also have an influence. For instance, all other things being equal, a higher percentage of aromatics in the feedstock will lead to a greater development of structure in the black. Injection of various additives also affects properties.

A thorough review of the various factors which affect carbon black properties will show many of them to be interlocking; that is, certain factors affect more than one property. Such interlocking becomes a problem when the carbon black producer wishes to adjust one property of his product while minimizing changes in other properties, as is frequently the case. An example of an interlocking factor may be found in the prior art pertaining to the introduction of calcium and other alkaline earth metals to the reaction zone of a carbon black furnace or reactor. Two distinctly different properties of carbon black which are affected by such practice are surface area and structure.

The surface area of a carbon black, as employed in this specification and in the appended claims, is the combined measureable surface of all of the particles in a given quantity, e.g. weight, of the black. The surface area of an individual particle is not solely dependent upon its diameter, since such particles very from the spherical in shape and exhibit surface roughness and porosity to varying degrees. Thus, it is not at all unusual for equal quantities of carbon black having similar distributions of particle sizes to exhibit quite different specific surface areas (surface area per unit weight). The surface areas of different carbon blacks may be determined by measuring the relative adsorptive powers of equal quantities thereof, since the surface area of each particle determines and is proportional to its adsorptive power. Thus, one known convenient method of measuring surface area is to weigh a sample of black, widely disperse and thoroughly mix the sample in a measured quantity of a solution containing a known concentration of a soluble material, then separate the carbon black and the soluble material adsorbed thereon from the remainder of the solution and measure the amount of soluble material removed from solution by the weighed sample of black. One example of such method will be set forth in greater detail hereinafter. Methods involving adsorption of gases are also known.

High surface area carbon blacks exhibit desirable coloring and reinforcing powers in addition to high absorptivity. Accordingly, the art has developed various methods of enhancing or controlling surface area by regulation of the rates at which feedstock, fuel and combustion-supporting gas, e.g. air, are introduced to a reactor. Because such regulation failed to produce enough enhancement of surface area or else enhanced surface area with an undesirably large loss of yield, it was suggested that alkaline earth metals be introduced into and dispersed in the reaction zone of a carbon black reactor at that place where the carbon black reaction commences, e.g. at that place where the feedstock starts to decompose and the carbon black commences to form. Thus, carbon black has been prepared in a furnace having a first cylindrical zone of relatively large diameter in which a continuous turbulent stream of hot combustion gases is generated by the burning of air and natural gas. Through the upstream end of said first zone, along its axis, are injected a feedstock and an alkaline earth metal which, for purposes of convenience, is introduced in the form of one of its compounds which is capable of being dissociated by the heat of the combustion gases along with the feedstock. The alkaline earth metal has been injected in a variety of ways, e.g. by dispersing it dry or as a water solution in the feedstock, or as a separate spray which enters the zone at the upstream end of the first zone, approximately at the axis thereof. Although this technique does permit the production of a carbon black of high surface area in a controlled manner, the technique also has quite marked effects upon the structure of the resultant product.

By the term "structure" as used throughout the specification and claims hereof is meant the degree of that phenomenon exhibited by carbon black particles associating or clustering to form chainlike, or rodlike, units of varying lengths and geometric configurations. Such formations may occur by virtue of the physical union of numerous particles and/or by virtue of the attractive forces between and among particles. In terms of the former, a minimum or low structure carbon black is accompanied by a minimum of physical union or "twinning" of particles with a substantial proportion of the particles being discretely divorced each from all the others. As the degree of structure increases, an increase in the number of rod-like carbon black units as well as an increase in the length of such units is evidenced. In terms of the latter, a minimum or low structure results when the attractive forces between and among the carbon black particles decrease in magnitude below the point of interference. As these attractive forces increase, the degree of structure increases as a result of interferences between and among particles.

Structure of carbon black can be observed under an electron microscope, although minor differences in carbon black structure can only be observed by a trained and experienced operator. Structure manifests itself in a number of ways, however, among which is the relationship between structure and oil absorption. Thus, assuming that other variables such as particle size and specific surface area are held constant, the ability of carbon to absorb oil increases as its extent of structure development increases. In effect, the formation of chainlike or rod-like units provides a "framework" of such units within a carbon black oil mixture which helps hold the resultant mass together and thus offsets the tendency of the mass to become "runny" as more oil is added. The differences in the extent to which two compact masses of loose (as opposed to pelleted) carbon black are able to absorb oil without becoming "runny" is therefore a measure of their relative degrees of structure development, assuming that other pertinent properties are equivalent, or that suitable adjustments have been made for differences in such other pertinent properties. From this phenomenon, there has been derived the oil absorption test for measuring the degree of structure of black. In general, this test involves the incremental addition of a standard linseed oil to a weighed quantity of black while working the mixture with a spatula. Oil addition is continued until the mixture reaches a predetermined consistency which constitutes the end point. The quantity of oil per quantity of black is the oil absorption factor and is usually measured in ml./gram, ml./100 grams, or gallons/100 pounds. While the mixing procedure and determination of the end point may vary with each individual conducting the test with corresponding variations in the oil absorption factor, nevertheless, the test is susceptible of reasonable reproducibility when practiced by the same individual and is accepted by the industry as a means for measuring the relative structure characteristics of different carbon blacks.

In rubber technology, the property of modulus is defined as the force per unit of original cross sectional area required to stretch a rubber specimen to a stated elongation. It is employed as a measure of the reinforcing effect of ingredients in rubber compounds. Once a standard test procedure using a standard test recipe has been established, therefore, it is possible to determine the effect the varying of a particular ingredient, e.g., carbon black, has on the property of modulus. It is recognized and accepted in the art, moveover, that the modulus value of a particular rubber specimen in which the carbon black has been varied from the standard is, when compared to the modulus value of the standard, a measure of the structure of the carbon black employed in the particular rubber specimen. Thus, if particle size and surface area are held substantially constant or if differences therein are suitably compensated for, the modulus value of a carbon black will vary directly, generally, with its structure value, i.e. the lower the modulus, the lower the degree of structure. Modulus values are more dependable than oil absorption tests for measuring structure at low and intermediate levels of surface area, e.g. below about 200 square meters per gram and become progressively less dependable than oil absorption tests at higher levels of surface area. Nevertheless, all other things being equal, a lowering of modulus generally indicates a lowering of structure.

As indicated above, the employment of alkaline earth metals as an aid to the development of high surface area while conserving product yield has produced, as a side effect, the degradation of structure, as evidenced by marked modulus reductions. Thus, it is apparent that alkaline earth metals are suitable for surface area development only to the extent that the consequent lowering of structure and modulus can be tolerated. For certain applications a simultaneous increase in surface area and decrease in structure or modulus may be desirable. In other cases, such as where the black is to be used in rubber or plastic compositions which are to be extruded, or where the black will be used as a filler in polymeric materials in which high structure blacks enhance processing capabilities, or where there is a desire to increase the tint which the black exhibits in printing inks while enchancing ink viscosity or at least minimizing losses in viscosity due to structure degradation, the degradation of structure incidental to the development of greater surface area can be a distinct disadvantage. Clearly the interlocking effect of alkaline earth metals on both surface area and structure is a problem, and there is a need for solution of such problem.

The principal object of the present invention is to fulfill the aforementioned need. A general object of this invention is to provide a method for enhancing the surface area of carbon black in a particular class of carbon black reactors. Another object of the invention is to provide a method for regulating the surface area of carbon black while minimizing unwanted effects upon structure. Still another object is to provide a method for introducing calcium and other alkaline earth metals such as strontium and magnesium to the reaction mass in a carbon black reactor for enhancing surface area while reducing the effects of such addition of the structure level of the resultant carbon black product. Another object is to produce a furnace carbon black corresponding in particle size and structure to a given grade of carbon black, such as HAF, ISAF, SAF and others, but possessing a substantially higher than usual surface area. Another object of the invention is the continuous production of carbon black at a generally constant level of particle size and structure, while making substantial variations in the surface area of such carbon black. Other objects and advantages of the invention will occur to persons skilled in the art.

Quite unexpectedly, it has been discovered that with a particular class of reactor, injection of alkaline earth metal at the proper location will produce pronounced effects upon surface area with minimal effects upon structure. The applicable class of reactors is characterized by the ability to carry out a furnace carbon black process, as above described, and by having two distinct chambers or zones separated by a restriction or choke having an opening which is of lesser cross-sectional area than either of said zones. One of said zones, which will be referred to as the first zone, is fitted with means for providing hot combustion gases therein, either by injecting said gases into said zone from an external burner or by burning fuel or feedstock or both in the zone itself with a combustion supporting gas such as air. The first zone is also provided with means for injecting feedstock and for cooperating with the restriction in producing a substantial dispersion of said feedstock in the hot combustion gases by the time they enter the second zone. The downstream end of the first zone communicates through the restriction with the upstream end of the second zone. Downstream of the upstream end of the second zone is a cooling means. The cooling means may be located within or outside, e.g. beyond, the down-stream end of the second zone. Preferred are those reactors having cylindrical chambers. A particularly preferred type of reactor has a first zone whose diameter is greater than its length and a second zone whose diameter is less than its length, and the length of the second zone is significantly longer than that of the first. The invention is not applicable, however, to reactors which lack the aforementioned restriction (or "choke" as it is sometimes called) and at the same time employ means for introducing hot combustion gases into the first confined zone tangentially.

Persons skilled in the art are aware of a variety of reactors falling within the above-described applicable class. Such reactors will, to be sure, differ from one another in the means for injecting feedstock and for providing hot combustion gases and in the positioning of such means. Other variations will be noted. However, so long as the reactor falls within the above-described class, the invention is applicable thereto. As a consequence of their internal arrangements, the applicable reactors compress the stream of hot combustion gases and hydrocarbon feed as they pass through the restriction and then release them as a turbulent mixture and diminish their rate of flow as they enter the second zone.

The discovery has been made that if alkaline earth metal is injected into the turbulent mixture (reaction mass) subsequent to its entry into the second zone, surface area may be increased while structure effects are minimized. Thus, the carbon black manufacturer is provided with a new degree of freedom in the regulation and/or enhancement of surface area.

This discovery is applicable to all of the alkaline earth metals, except barium. The latter does not affect structure in the manner that other alkaline earths such as calcium do, but the compounds of barium are several times as expensive. Thus, the invention contemplates the introduction of calcium, strontium or magnesium or mixtures thereof as metal or as compounds into the reaction mass. Where compounds are employed, they may be introduced as solids in suspension, as slurries in a dispersion liquid (e.g. water or organic carrier liquid) or as water or organic solvent solutions. Organic or inorganic compounds, such as organic acid salts, mineral acid salts and hydroxides are contemplated, but the halides, and especially the chlorides, are preferred on account of their ready availability, water solubility and reasonable cost.

The amount of alkaline earth metal may be widely varied in accordance with well known principles in accordance with the extent of surface area development desired. Generally, it is preferred that the metal be employed in a weight concentration of about .03% to about 1.5% on the feedstock.

The alkaline earth metal is preferably injected immediately downstream of the restriction, since the maximum contact time is thus obtained in a reactor of a given length. In longer reactors, the metal injection means may be located well downstream of the restriction. In such case, care should be exercised to see that the cooling means (e.g. water, steam or dry quench) is located a substantial distance downstream of the metal injector. By a substantial distance is meant a distance which is long enough to provide a contact time between the reaction mass and metal to produce a significant effect on surface area or the surface area/yield relationship.

The combustion supporting gases, fuels and feedstocks employed in the present invention are not critical and therefore will not be described in detail. Suffice it to say that they are thoroughly described in the patent literature and are well known to persons skilled in the art.

The reactor in which it is preferred to carry out the invention is quite similar to that shown in U.S. Patents 3,060,003 and 3,222,131, but is slightly modified in respect to burner design and provision of means for injection of alkaline earth metal. In all other respects, the reactor is capable of operating in the same manner as the one shown in the aforementioned patents, and the disclosures of said patents are incorporated herein by reference, it being understood that resort may be had to the disclosures thereof for parts not described herein. As to such parts of the reactor of U.S. Patent 3,222,131 which have been retained, the numbering of the parts in the drawing of said patent is the same as the numbers of the parts in the drawing submitted herewith.

The modifications to the reactor shown in the drawings of U.S. Patent 3,222,131 will now be described. Instead of a fuel injection ring, the present reactor is provided with a plurality of gas jets 20 which are secured at angularly spaced intervals around the front face of ring 12. The jets communicate with the enclosed space 27 between tubular members 9 and 10. The fuel supply pipe 19 opens into the space 27 instead of extending therethrough to the fuel injection ring, which has been eliminated. Combustion supporting gas moves through space 28 between tubular members 10 and 11, mingles with the fuel gas exiting gas jets 20 as the combustion supporting gas and fuel pass through orifice 14, and the resultant ignitable mixture burns in first zone 2.

The reactor shown in the drawings of this application retains the feedstock injection nozzle 17 and pipe 16 and they are connected by a supply pipe 26 to a source of feedstock (not shown) which is under sufficient pressure to atomize the feedstock as it departs nozzle 17.

For the purpose of comparing the effect of introducing the alkaline earth metal into the second zone in accordance with the invention, against the effect of injecting it into the first zone, an auxiliary alkali metal compound injector pipe 29 is provided. Neither this pipe nor the associated equipment about to be described is employed in practicing the invention, but they were employed in one of the examples which follow as an illustration of prior art practice. Thus, pipe 29 extends alongside the feedstock pipe 16 in tubular member 11 and has its outlet adjacent feedstock spray nozzle 17. Pipe 29 is connected through supply pipe 22 with an atomizer 23 which in turn is connected through pipe 24 with a source (not shown) of alkaline earth metal solution under pressure, and through pipe 25, with a source (not shown) of high pressure air for atomizing the alkaline earth metal solution.

In accordance with the invention, the reactor disclosed herein is provided with a radial port 31 through the metal casing and refractory lining of the furnace opening into the second zone 3 immediately downstream of restriction or choke 7. In port 31 is an alkali metal injection pipe 32 having its inner end slightly within the inner end of port 31 and having its outer end connected to atomizer 33. The latter, in turn, is connected through pipe 35 with a source (not shown) of alkaline earth metal solution under pressure, and through pipe 34 with a source (not shown) of high pressure air for atomizing the alkaline earth metal solution.

In order to demonstrate to those skilled in the art the preferred manner of carrying out the process of this invention, the following examples are given. All parts are parts by weight unless the contrary is clearly indicated. The examples are presented primarily by way of illustration, and the various details described therein are not to be interpreted as limitations upon the invention except to the extent required by the appended claims. Considerable variation is possible. For instance, although the reactor employed in carrying out the examples is the one shown in the accompanying drawing and described in detail in this specification the art can readily practice the invention in other reactors within the applicable class discussed herein. Although a particular feedstock and particular conditions tending to produce a particular grade of carbon black have been set forth for the sake of concreteness, persons skilled in the art can readily substitute other feedstocks and select different combinations of operating conditions, all in accordance with well-known principles.

Other variations will readily occur to those having experience in the art of producing carbon black.

The dimensions of the reactor used in the examples are as follows:

First zone:
    Diameter _____ 36 inches.
    Length _____ 15 inches.
Air inlet annulus:
    Diameter _____ 12 inches.
    Width _____ ¾ inch.
Restriction ring:
    Internal diameter _____ 7 inches.
    Length _____ 9 inches.
Second zone:
    Diameter _____ 15 inches.
    Length _____ 10 feet, 6 inches.
Additive injector 32:
    Distance of pipe from downstream face of restriction ___ ½ inch (approx.).
Quench sprays:
    Distance from additive injector 32 _____ 10 feet, 5½ inches (approx.).

A hydrocarbon feedstock having the following analysis is employed in the examples:

Gravity, API at 60° F. _____ 2.5
Viscosity, SU sec./210° F. _____ 43.6
Conradson carbon, percent _____ 6.42
Correl. index _____ 116
Distillation:
    IBP ° F., 760 mm. _____ 463
    5% _____ 632
    10% _____ 674
    20% _____ 700
    30% _____ 704
    40% _____ 721
    50% _____ 739
Oil began to crack.

Natural gas having a B.t.u. rating of about 1050 B.t.u./ft.$^3$ net is employed as fuel with ambient air as the combustion supporting gas. The charging rates and other operating conditions are as follows:

Combustion air rate _____s.c.f.h__ 190,000
Natural gas rate _____s.c.f.h__ 12,260
Feedstock rate (metered @ 60° F.) _____g.p.h__ 173
Feedstock injector spray angle _____degrees__ 30
Feedstock preheat temperature _____° F__ 600

The pipe 32 for injecting the additive into the second zone of the reactor was ¼ inch IPS stainless steel pipe extending to within one inch of the wall of said zone. The oil absorption tests employed in the examples of this application are conducted in accordance with the procedure set forth in lines 33–47 of column 8 of U.S. Patent 3,222,131.

Where iodine numbers are referred to in the examples they were determined by the following procedure: 0.3333 gram of carbon black are placed in a flask; 10 ml. of 0.479 N iodine solution and 40 ml. of water are added to the carbon black, the mixture is shaken 30 seconds, then allowed to stand 5 minutes. The mixture is then filtered and 20 ml. of the filtrate are titrated with standardized sodium thiosulfate solution to the usual iodine endpoint using starch solution indicator. A "blank" solution of 10 ml. 0.479 N iodine solution and 40 ml. of distilled water is prepared, and 20 ml. of this "blank" solution is titrated with the same sodium thiosulfate solution as used with the filtrate. The iodine number is computed as follows: iodine number=3×normality of sodium thiosulfate×317.26×(B−S). B is the number of ml. of sodium thiosulfate required to titrate the blank and S is the number of ml. of sodium thiosulfate required to titrate the filtrate from the sample.

Example 1

In this example, the reactor was operated as above described without any injection of alkaline earth metal. The rates and other conditions set forth hereinabove, except the distance from the choke to the quenching nozzles, are such as would normally produce an ISAF grade of carbon black.

Example 2

Without changing the conditions employed in Example 1, calcium chloride solution was admitted to the reactor, solely through outlet 21 of injector pipe 29. This is the situs of injection used in prior art methods in other reactors. The calcium chloride was dissolved in water in a ratio of 147 pounds of calcium chloride to 300 gallons of water. The solution feed rate was 6.5 gallons per hour. Atomizing air was employed at the rate of 500 s.c.f.h. The resultant concentration of calcium chloride relative to feedstock was 0.0183 pound per gallon (feedstock weighs about 8.8 pounds per gallon at 60° F.) or about 0.075% calcium metal based on feedstock weight.

Example 3

This example was conducted in accordance with the invention. The introduction of calcium chloride solution was solely through pipe 32 at the same rates and concentrations as in Example 2.

The products of Examples 1 through 3 were sampled separately and were tested for oil absorption, as a measure of structure, and for iodine number as a measure of surface area. The results are set forth in the following table.

TABLE

| Test | Injection Data | | |
|---|---|---|---|
| | Adjacent Feedstock Nozzle (Example No. 2) | Downstream of the Restriction (Example No. 3) | No Alkaline Earth Metal (Example No. 1) |
| Iodine Number (m.²/gram)___ | 339 | 404 | 188 |
| Oil Absorption (ml./gram)____ | 1.28 | 1.43 | 1.48 |

As is evident from the table, the example in accordance with the invention (Example 3) produced a higher surface area than either the control (Example 1) or the prior art (Example 2) while the oil absorption was the substantial equivalent e.g. within 5%, of the control.

What is claimed is:

1. In the known process of regulating the surface area of carbon black as it is produced in the furnace process by preparing said carbon black by the decomposition of hydrocarbon feedstock in the presence of hot combustion gases and an alkaline earth metal, the improvement which comprises in combination: conducting said decomposition by providing said hot combustion gases in a first zone into which said feedstock is injected, turbulently mixing said feedstock and hot combustion gases and introducing them into a second zone through a restriction or choke of lesser cross-section than either of said zones, injecting an alkaline earth metal selected from the group consisting of calcium, strontium and magnesium and mixtures thereof into the resultant turbulent reaction mass in said second zone, cooling said reaction mass below reaction or dissociation temperature a substantial distance downstream of the point of injection of said alkaline earth metal and recovering the resultant product.

2. Process in accordance with claim 1 wherein the alkaline earth metal is injected in the form of at least one compound of said metal or metals.

3. Process in accordance with claim 2 wherein the compound is a halide.

4. Process in accordance with claim 2 wherein the compound is a chloride.

5. Process in accordance with claim 2 wherein the compound is in solution.

6. Process in accordance with claim 2 wherein the compound is calcium chloride.

7. Process in accordance with claim 1 wherein the diameter of the first zone is greater than the diameter of the second zone and the length of the second zone is greater than its diameter.

8. Process in accordance with claim 1 in which the hot combustion gases are provided in the first zone by burning an ignitable mixture of fuel gas and air and a portion of the feedstock in said first zone.

9. Process in accordance with claim 8 in which the feedstock is introduced near the axis of said first zone at the upstream end thereof.

10. Process in accordance with claim 1 wherein said ignitable mixture is initially introduced to said first zone out of contact with said feedstock, is burned, is caused to change directions and flow radially inwardly in said zone at the downstream end thereof, is passed through said restriction and is compressed, is mixed with said feedstock and is caused to emerge from said restriction with said feedstock dispersed therein, whereby the resultant reaction mass proceeds to expand and eddys downstream of said restriction and to proceed through said second zone, said alkaline earth metal is injected into said reaction mass immediately downstream of said restriction, said reaction mass traverses a substantial distance downstream from said restriction and is then cooled below reaction temperature.

References Cited
UNITED STATES PATENTS

| | | | |
|---|---|---|---|
| 3,117,016 | 1/1964 | Smith | 106—307 |
| 3,206,285 | 9/1965 | Johnson | 23—209.4 |
| 3,222,131 | 12/1965 | Powell et al. | 23—209.4 |

EDWARD J. MEROS, *Primary Examiner.*